(12) United States Patent
Christodoulou et al.

(10) Patent No.: US 7,505,157 B2
(45) Date of Patent: Mar. 17, 2009

(54) METHOD AND APPARATUS FOR EMBODYING DOCUMENTS

(75) Inventors: Athena Christodoulou, Bristol (GB); Richard Taylor, Bristol (GB); Christopher Tofts, Halifax (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1276 days.

(21) Appl. No.: 09/947,841

(22) Filed: Sep. 5, 2001

(65) Prior Publication Data

US 2002/0102119 A1 Aug. 1, 2002

(30) Foreign Application Priority Data

Jan. 31, 2001 (EP) ................... 01300824

(51) Int. Cl.
*G06F 3/12* (2006.01)
*G06F 15/00* (2006.01)

(52) U.S. Cl. ..................... 358/1.15; 358/1.13

(58) Field of Classification Search ............... 358/1.15, 358/1.4, 1.9, 1.13, 1.14; 709/208, 213, 226
See application file for complete search history.

(56) References Cited

U.S. PATENT DOCUMENTS

| | | | | |
|---|---|---|---|---|
| 5,155,851 A | | 10/1992 | Krishnan | 395/650 |
| 5,179,637 A | * | 1/1993 | Nardozzi | 358/1.15 |
| 5,619,624 A | * | 4/1997 | Schoenzeit et al. | 345/418 |
| 5,696,598 A | | 12/1997 | Yoshida et al. | 358/434 |
| 5,712,712 A | | 1/1998 | Sayward | 358/1.2 |
| 5,859,711 A | * | 1/1999 | Barry et al. | 358/296 |
| 5,987,225 A | | 11/1999 | Okano | 358/1.13 |
| 6,078,919 A | | 6/2000 | Ginzburg et al. | 707/10 |
| 6,091,507 A | * | 7/2000 | Vatland et al. | 358/1.15 |
| 6,222,635 B1 | | 4/2001 | Gotoh | 358/1.15 |
| 6,441,920 B1 | | 8/2002 | Smith | 358/1.2 |
| 6,519,053 B1 | | 2/2003 | Motamed et al. | 358/1.16 |
| 6,577,407 B1 | * | 6/2003 | Kopecki | 358/1.15 |
| 6,678,068 B1 | * | 1/2004 | Richter et al. | 358/1.15 |
| 7,099,815 B2 | | 8/2006 | Christodoulou et al. | 703/21 |
| 7,143,316 B2 | | 11/2006 | Christodoulou et al. | 714/43 |
| 7,148,985 B2 | | 12/2006 | Christodoulou et al. | 358/1.15 |
| 2002/0149800 A1 | | 10/2002 | Medina | 358/426.02 |
| 2002/0181019 A1 | | 12/2002 | Christodoulou et al. | 358/1.15 |
| 2002/0184000 A1 | | 12/2002 | Christodoulou et al. | 703/22 |
| 2003/0007176 A1 | | 1/2003 | Takamine | 358/1.15 |
| 2003/0016388 A1 | | 1/2003 | Christodoulou et al. | 358/1.15 |
| 2003/0142347 A1 | | 7/2003 | Christodoulou et al. | 358/1.15 |
| 2004/0196494 A1 | | 10/2004 | Binder | 358/1.15 |
| 2005/0179940 A1 | | 8/2005 | Konji et al. | 358/1.15 |
| 2006/0107084 A1 | | 5/2006 | Taylor et al. | 714/1 |
| 2006/0107110 A1 | | 5/2006 | Taylor et al. | 714/12 |
| 2006/0129882 A1 | | 6/2006 | Taylor et al. | 714/12 |

FOREIGN PATENT DOCUMENTS

EP 0 459 931 A2 12/1991

(Continued)

*Primary Examiner*—Dov Popovici (57) ABSTRACT

An information technology network comprises a plurality of printers and at least one computing entity which serves as a print manager. The print manager is adapted to process print jobs by distributing the ripping process between two or more different printers, and then returning disparately ripped data to a single printer for physical marking of documents with indicia in accordance with the ripped data.

13 Claims, 8 Drawing Sheets

FOREIGN PATENT DOCUMENTS

| | | |
|---|---|---|
| EP | 0 733 965 A1 | 9/1996 |
| EP | 0 917 044 A2 | 5/1999 |
| EP | 0 578 264 B1 | 6/2001 |
| GB | 2380911 A | 4/2003 |
| GB | 2390447 A | 1/2004 |
| GB | 2419699 A | 5/2006 |
| JP | 2000-259591 | 9/2000 |
| WO | 98/32096 | 7/1998 |
| WO | 98/57275 | 12/1998 |
| WO | 99/44121 | 9/1999 |

\* cited by examiner

```
/*
  Skeleton rip_nprint, send and status functions, written in a C like languages,
  all of which rely on POSIX compliant i/o substructure
*/

/*
 Skeleton rip_nprint function on completion, returns a pointer to data structure that represents
 the transformed data
*/

/*
  success of ripping operation
*/
enum success {
  done,       /* rip complete */
  fail,       /* rip failed */
  incomplete  /* rip incomplete */
};

/*
  result of ripping operation
*/
struct rip_pcl {
  enum sucess result; /* result of operation */
  rip  *data
};

/*
 rip_nprint
*/
enum success rip_nprint(pcl *raw_data, char *rip_name, char *my_name){
  rip_pcl *completed; /* data once operated on */
  network_id source, destination;
  socket_interface dest_printer;

setup(completed); /* allocate space for completed data structure */
  source = return_net_id(my_name);
  destination = return_net_id(rip_name);
  dest_printer = open_socket(destination, source);
  if (dest_printer != NULL) {
   if ((transmit(dest_printer, data) != NULL) {
    return (success);
   } else
   {
     return (fail);
   }
  } else
  {
   return(fail);
  }
}
```

Fig. 3

```
/*
 skeleton send function takes name of destination to which data must be transmitted, calls i/o function
 transmit, and returns a success flag
*/ enum success send_rip(rip *data, char * dest_name, char * my_name) {
  network_id source, destination;
  socket_interface dest_device;

source = return_net_id(my_name);
  destination = return_net_id(dest_name);
  dest_device = open_socket(destination, source);
  if (dest_printer != NULL) {
   if ((transmit(dest_printer, data) != NULL) {
    return (success);
   } else
   {
     return (fail);
   }
  } else
  {
   return(fail);
  }
}
```

```
/*
 job data structure
*/ struct job {
 long_int priority;
 long_int time_to_complete;
 long_int memory_to_complete;
};

/*
   status data structure (minimal), leaving out temp, paper handling,
   error and wear statuis
*/ struct status {
   struct job job_list[max_jobs];
};

/*
   skeleton status function
*/ struct status *get_status(char *rip_name, char *my_name) {
   network_id source, destination;
   socket_interface dest_device;
   struct job *this_job;

job = allocate_jop_status();
   source = return_net_id(my_name);
   destination = return_net_id(dest_name);
   dest_device = open_socket(destination, source);

job = call_remote_function(dest_device, status);

return(job);
}
```

Fig. 7

METHOD AND APPARATUS FOR EMBODYING DOCUMENTS

BACKGROUND OF THE INVENTION

1. Field of the Invention

The present invention relates to the conversion of source data into a document, such as for example, the printing of a document on paper or some other readable medium, from source data such as an electronic data file. A typical example of a source data file representing a document is an electronic data file, created using a word processing program, and which may be embodied by printing onto paper, or display on a computer monitor, for example.

In this specification the term "document" is intended to be interpreted broadly, to encompass within its scope any assimilable manifestation of source data. Thus a "document" may be embodied for visual assimilation (printed on paper, displayed on a monitor), aural (on audio tape) or tactile assimilation (e.g. the printing of Braille), and while printing of a document may indicate one manner in which a document may be embodied (i.e. on tangible "hard" media such as paper), it is not the only way of creating a document from a source data file. The process of converting source data into a document varies widely in dependence upon what is known as the "device implementation" of the source data, that is to say the genus of document to be created (e.g. visual, or tactile), and the specific parameters of the medium on which the document is to be embodied (e.g. in the case of printing, large paper, small paper, etc. . . . , or even printing on some other medium such as for example a carpet).

2. Description of Related Art

In the case of printing source data onto paper (or some other printable medium), it is known to connect one or more elements of computing capability (e.g. elements which include both processing and storage capability in any form—e.g. shift registers—being classifiable as either a storage element, or part of a processor) to an electromechanical device adapted to deposit ink onto paper, known in the art as a print engine, in order to produce a printed document. There are a number of different generea of print engine. One genus comprises a print-head supported on a carriage adapted to move laterally relative to an advancing page, so that marks may be deposited on any part of the page by a suitable combination of a lateral motion of the carriage and forward motion of the page. The majority of printers of this type deposit visible indicia on a page, and so are colloquially known as an "inkjet" printer. A further genus, known as a "laserjet" printer has a rotating drum upon which ink (which as indicated above is intended to encompass toner and any other substance which may be used to create indicia, regardless of whether such indicia are visible in certain types of light) is deposited in a predetermined pattern by means of the use of electrostatic charge and a laser; subsequent contact between the surface of the drum and a page deposits the ink from the drum onto the page. In each case operation of the elements of the print engine is controlled by means of the computing elements to which they are connected, with the quality and speed of printing being dependent not only upon the print engine, but also on the operation and capability of the computing elements. Typically the various computing elements which are required in order to: (a) create a source data file; (b) transform the source data file into a set of instructions useable for controlling the print engine; and (c) control the print engine in accordance the aforementioned instructions, are distributed between different physical locations. Some are packaged with the print engine, others with a desktop computer, for example. In commercial vernacular the appliance which includes the print engine is known as a printer, regardless of how much or little computing is performed by any computing elements which may be packaged with the print engine, and operations which are performed in order to produce a printed document from, for example, a document prepared using a word processing package are known as the "print pipeline".

In contemporary information technology, printers and computers are frequently part of a network of, inter alia, one or more other printers and computers, all of which are either interconnectable or interconnected. Thus a user (whether a human user, or computing entity) working at a particular computer will frequently have a choice of a number of printers to use in order to perform a particular print job. The selection the user makes may depend, for example, upon the size of the job, the desired quality of the job and the speed with which the job is required; in addition the user's choice may also be influenced by the availability of a particular printer and its physical proximity.

SUMMARY OF THE INVENTION

A first aspect of the present invention relates to the appreciation that an information technology network which includes a plurality of printers has, intrinsically, a potential printing capacity which exceeds the currently achievable actual printing capacity when operated in accordance with existing methods.

According to a first aspect of the present invention there is provided a method of printing a document comprising the steps of:
sending a first set of source data to a primary printer for ripping by the primary printer to produce a first ripped data file;
sending the first ripped data file to a print engine of the primary printer;
operating the said print engine on the basis of the first ripped data file to create a first part of the document;
sending a second set of source data to a secondary printer for ripping by the secondary printer to produce a second ripped data file;
sending the second ripped data file from the secondary printer to the said print engine; and
operating the said print engine of the primary printer on the basis of the second ripped data file to produce a second part of the document.

Thus a document physically printed at a single printer may undergo processing for such printing at a plurality of different printers, by distributing the processing burden between printers. Typically the method will be implemented in a network of printers and other computing entities, and according to a further independent aspect of the present invention there is provided a information technology network comprising at least one print manager computing entity and a plurality of printers, wherein at least two of the printers are adapted to respond to a predetermined command from the print manager to rip source data, but not automatically to pass resultant ripped data to a print engine.

Printers which are thus adapted may be used to enable distribution of the processing burden. Preferably the printers are additionally adapted to respond to a command to send the resultant ripped data to another printer of the network.

Yet a further independent aspect of the present invention provides a printer comprising: a print operations function including a print engine and feed and finishing capability, a processor, at least one data storage medium, and at least one network port to enable connection of the printer to elements of an information technology network, wherein the processor is adapted to respond to a command received via the network port to rip source data, but not automatically to pass ripped data to the print engine.

Preferably the printer is additionally adapted to respond to a command to send the ripped data to another location, typically another printer, within the network, in order that the data may be passed to the print engine of the other printer for conversion into a document.

BRIEF DESCRIPTION OF DRAWINGS

Embodiments of the present invention will now be described, by way of example, and with reference to the accompanying drawings, in which:

FIGS. 2A and B are schematic representations of an information technology network including a plurality of printers;

DESCRIPTION OF PREFERRED EMBODIMENTS

Referring now to FIGS. 1A-E, a document 10 contains lines of text 12, and both the text and its format on a page are stored within a source data file. The source data file of the document will typically be created by reference to the document itself, the creator of the source file using the document which is created in real time on a computer screen from the source file as visual feedback for the creation of the source file. Typically, for source files created using word processing programs, the form of the source file will be particular to the word processing program that is being used to create it, although as is well known in the art there are features which are common to virtually all such programs. For example, in accordance with an ASCII standard, each letter of the alphabet is represented by a number (e.g. the letter "a" is represented by the number 56); however particular characters used to represent different formats for such letters differ from program to program.

Figure 1A:
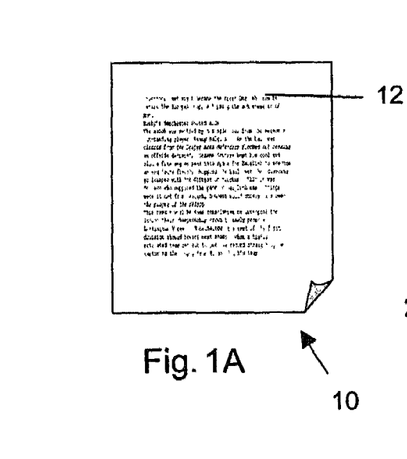
FIGS. 1A-E are schematic representations of operations forming part of the print pipeline.
Figure 1B:
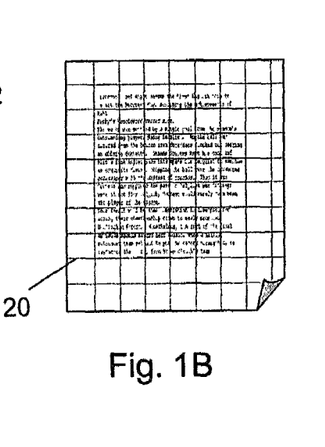

The creation of a printed document from a source data file involves a number of operations which collectively are known as a "print pipeline". The first operation within the print pipeline is to define a visual image of the document in a computer language called page control language (PCL for short). Referring now to FIG. 1B, this involves defining a page in accordance with a predetermined size (typically determined by the creator of the source file), and dividing the page into a grid of boxes 20, each of which contains a relatively small amount of text. The provision of a representation of the document in PCL may be described in simple terms as breaking the page down into manageable chunks, themselves defined by the boxes 20 of the grid.

Figure 1C:
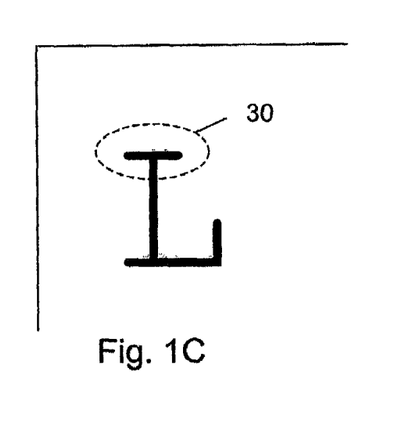
Figure 1D:
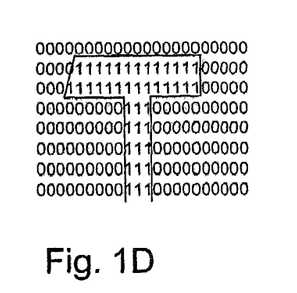
Figure 1E:
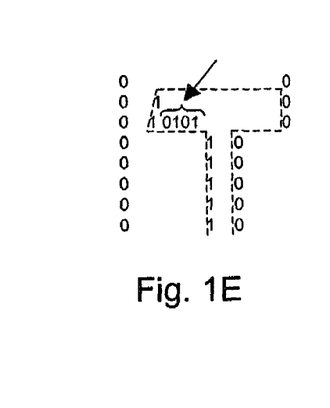

Referring now to FIGS. 1C and D, each of the individual grid boxes 20 is then subject to a process known in the art as ripping. Ripping is effectively a raster scan of a grid box 20, the result of which is that the text in the box is represented as an electronic digital array of a series of "1"s and "0"s. Thus the seriph of the capital "L" highlighted within the dashed ellipse 30 in FIG. 1C is seen represented by an array of "1"s against a background of "0"s as illustrated in FIG. 1D (an outline being shown for emphasis only). The resultant digital array (or "bitmap") of numbers is then used directly to instruct the print engine where to deposit ink on a page, i.e. in the representation of FIG. 1D it is intended that ink is to be deposited by the print engine wherever there are "1"s, with the spacing between adjacent bits typically being equal to the smallest indexing movement of the print engine which is repeatably achievable. An intrinsic characteristic of the ripping process is that because of the volume of processing operations required it is not possible to determine in advance the amount of time required to rip a given PCL file. Following ripping, the ripped data is stored, typically on one or more of the storage elements of the printer which is performing the printing. The ripped data is typically stored because, given the relatively large processing time, it is desirable to perform ripping of a document only once, and it frequently occurs that the print engine is not able to act upon the ripped data in real time, e.g. because it is busy, or simply because it is not able to operate sufficiently fast to keep up with the ripping process. However storage of ripped data creates a further problem, because of the relatively large volume of data produced by the ripping process; the better the ripping process in respect of a given document the larger quantity of data that is produced, and as with the time required to complete a ripping operation, it is not possible to determine in advance the amount of data which will be produced by ripping process (there usually being an ephemeral requirement during the course of the ripping process for more storage—e.g. disk—space than simply the amount of storage space used to store the end result of the ripping process). It is thus necessary to compress the ripped data prior to storage, and an example of compressed ripped data is illustrated in FIG. 1E. The compression routine defines, for each row, the first bit of a section of the row where all subsequent bits are of the same type, and adjacent to that first bit, a binary number equal to the number of identical bits that follow in that row. Thus for example, the first bit of an exemplified part of a row in FIG. 1E is a "1", and is followed by the number "0101" (the number "10" in binary), indicating that 10 further bits of value "1" follow, thus constituting a saving of 6 bits stored (the ten bits that would have been stored in the absence of compression, less the four that are required in order to indicate the presence of these ten in uncompressed data).

In connection with the print pipeline described above, it should be noted that the form of source data is to an extent dependent upon perspective. Thus for example, from the perspective of preparing the PCL file, the source data will be the file created by the word processing program used to create the source data. However, from the perspective of the ripping operation, the source data may be regarded as the PCL file.

Figures 2A, 2B:
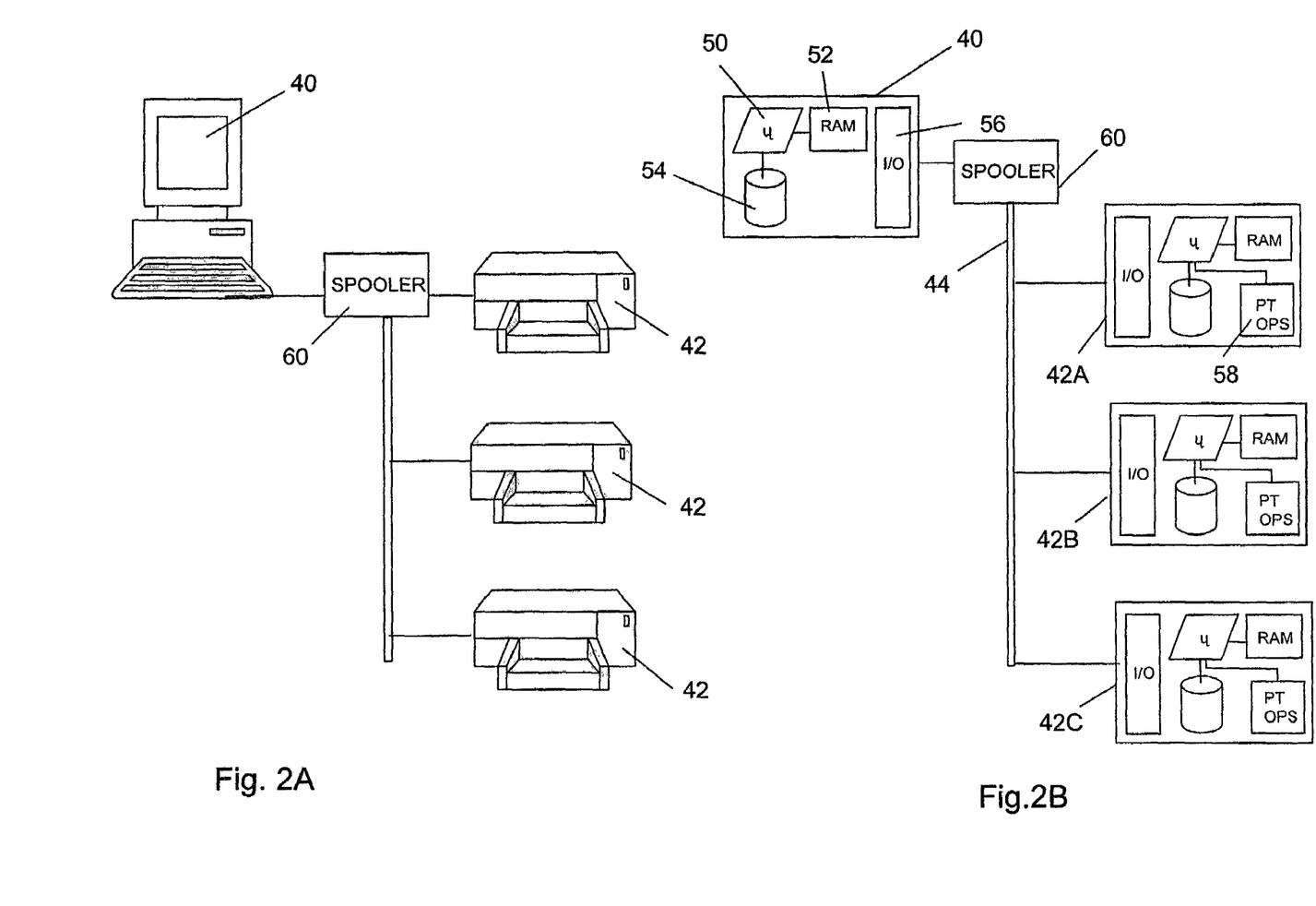

Referring now to FIGS. 2A and B, the network of hardware elements for performing the operations thus far described includes a standard desktop PC 40, and a plurality of printers 42, all of which are interconnected via network links 44. The computer 40 and printers 42 include similar computing hardware elements, including in each case a processor 50, RAM 52, hard disc storage 54 and an input/output function (including LAN card, etc., as appropriate) 56, which will typically include a USB. In addition, each of the printers 42 have the mechanical elements necessary for performing printing operations, i.e. a print engine, together with feed and finishing elements, all of which are represented schematically by the designation "Pt Ops", and having the reference numeral 58. A network element known as a spooler 60, which has the function of acting as a data buffer between the computer and the printers is also provided, and comprises a storage disk and processor (not shown). Spoolers and their function are known per se and shall not be discussed further.

While existing printers have hardware which is similar from a functional point of view to that of computers, typically the hardware is configured, whether by application or system software, such that its capabilities are somewhat different to those of a computer. For example each of the printers will be equipped with what is, from a functional perspective, relatively standard application software, whose purpose is the performance of ripping, compression, and storage operations. In addition, each printer will also be provided with system software, typically stored on the hard disc storage 54, to enable the printers to receive and process relatively large volumes of data (e.g. documents to be printed), and to send status information regarding the progress of a particular print job (or, in the case of an "error" message, the lack of such progress). A typical print operation involving the elements of the network described above operating in their usual (i.e. prior art) manner involves the dispatch to a particular printer of a source data file, which the printer in question then processes in the manner described in relation to FIGS. 1A-E above. During the course of this procedure, the printer is adapted to send back status information to the controlling computing entity regarding the number of pages processed and printed, or, in the event of a problem with the printing operation, an error message. For the purpose of simplicity it will be assumed in the subsequent illustrated example that management of all printing operations within the illustrated network is performed exclusively by a program running in computer 40, and which will hereinafter be referred to as the print manager. Thus, in this example the only instructions that the printers 42 will receive will be from the print manager. In practice other computers forming part of the same network are likely to make printing demands upon the printers 42, and the manner in which this complication may be taken into account will be discussed subsequently.

Figure 3:
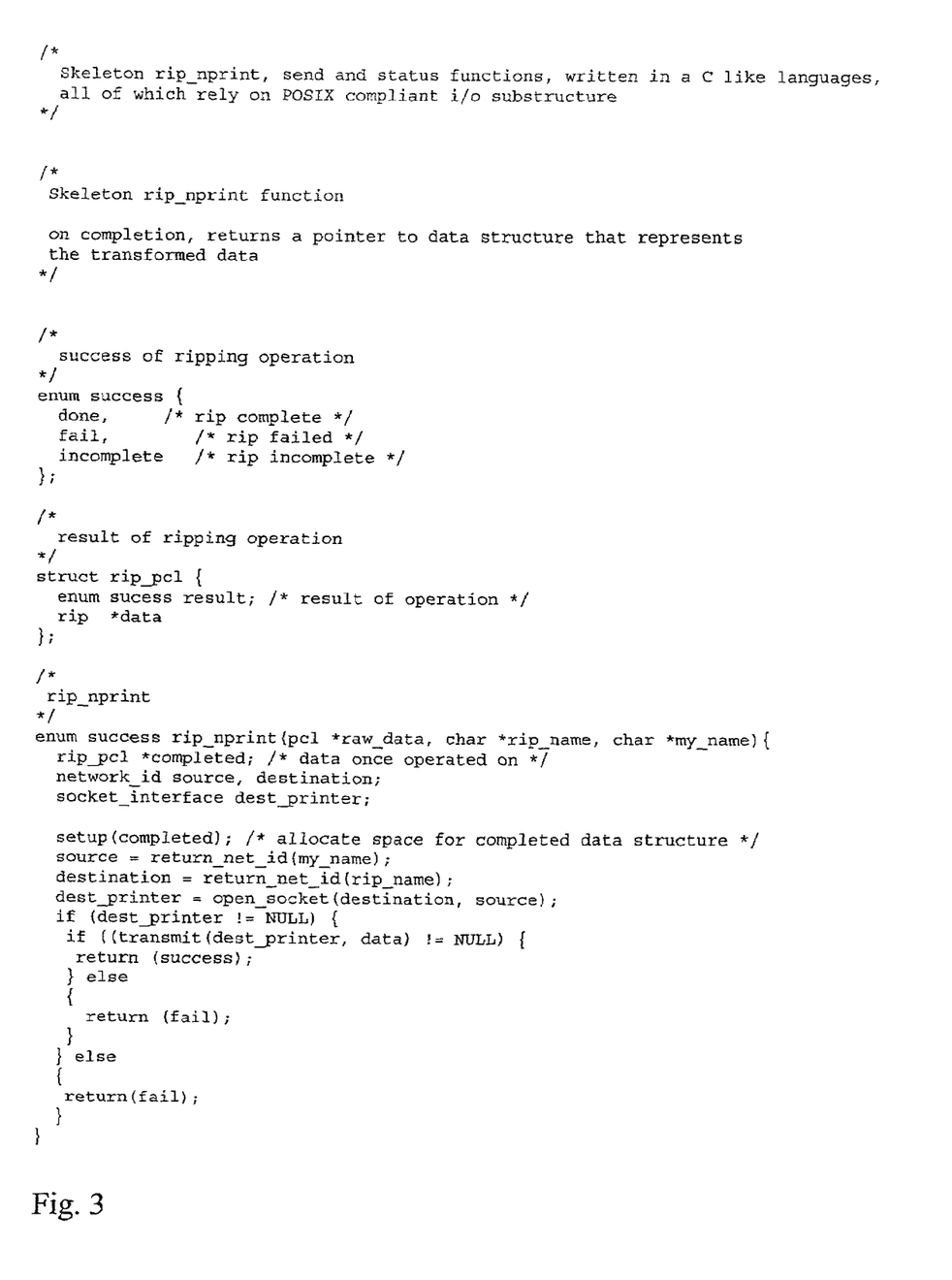
FIGS. 3 and 4 are program listings for additional functions executable within the network printers of FIGS. 2A and B.
Figure 4:
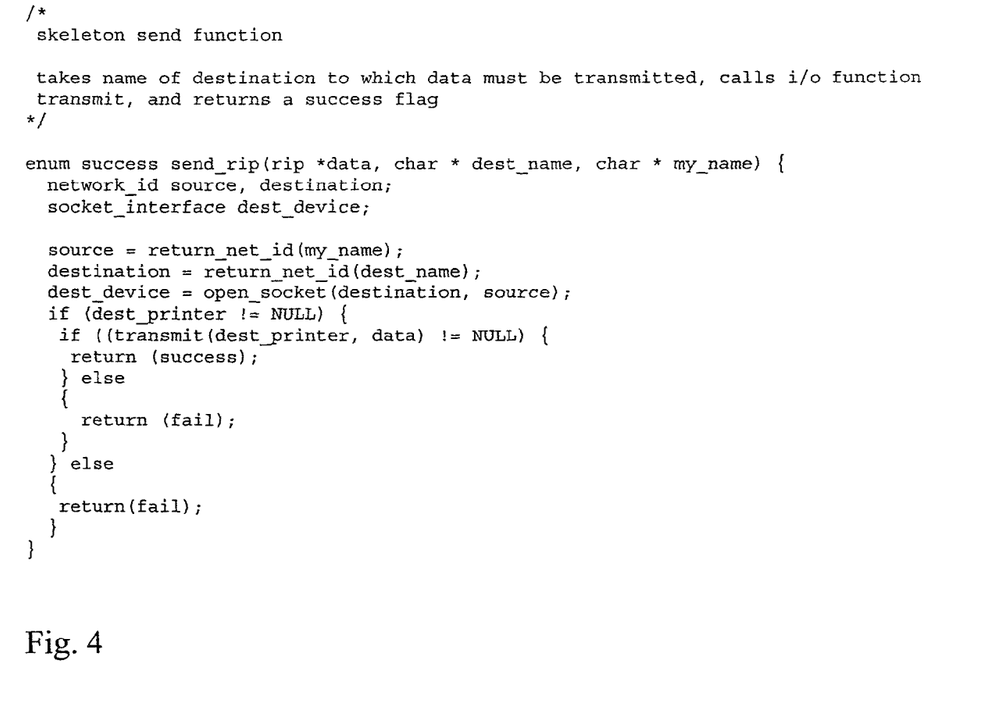

In accordance with one aspect of the present invention, it is provided that what may be termed the "latent" computing capability of each of the printers be made available to ameliorate bottlenecks in the print pipeline. Each of the printers 42 is provided with auxiliary system software, which in the illustrated embodiment essentially amounts to two extra library functions. The first of these functions is a "RIP NPRINT" function, a program listing for which is shown in FIG. 3. This instructs the printer to rip data received in the associated message, but not to pass the ripped data sir, to the print ops. 58 for printing (the ripped data, as explained above is stored on the disk 54 of the printer during standard ripping and printing operations); in addition, the RIP NPRINT function may also incorporate an instruction to report to the print manager when the allocated ripping operation is finished. A further of these auxiliary functions is a "SEND" function, a program listing for which is shown in FIG. 4. Execution of the SEND function causes the processor to dispatch designated data) to a designated network location.

Using these auxiliary commands, it is possible, for a given print job, to distribute the burden of ripping the data in a PCL file (which, for the sake of this example, it is assumed the printer will receive from the computer 40—transformation from the source data file into PCL having been performed in the computer 40) between printers, even though the entire job is to be printed preferentially at a single printer. The process of distributing the ripping processes, retrieving ripped data, and otherwise controlling the various printers of the network to ensure that the desired outcome is achieved is controlled by a print management program within the computer 40, and which operates in a manner now to be described.

Figure 5A:
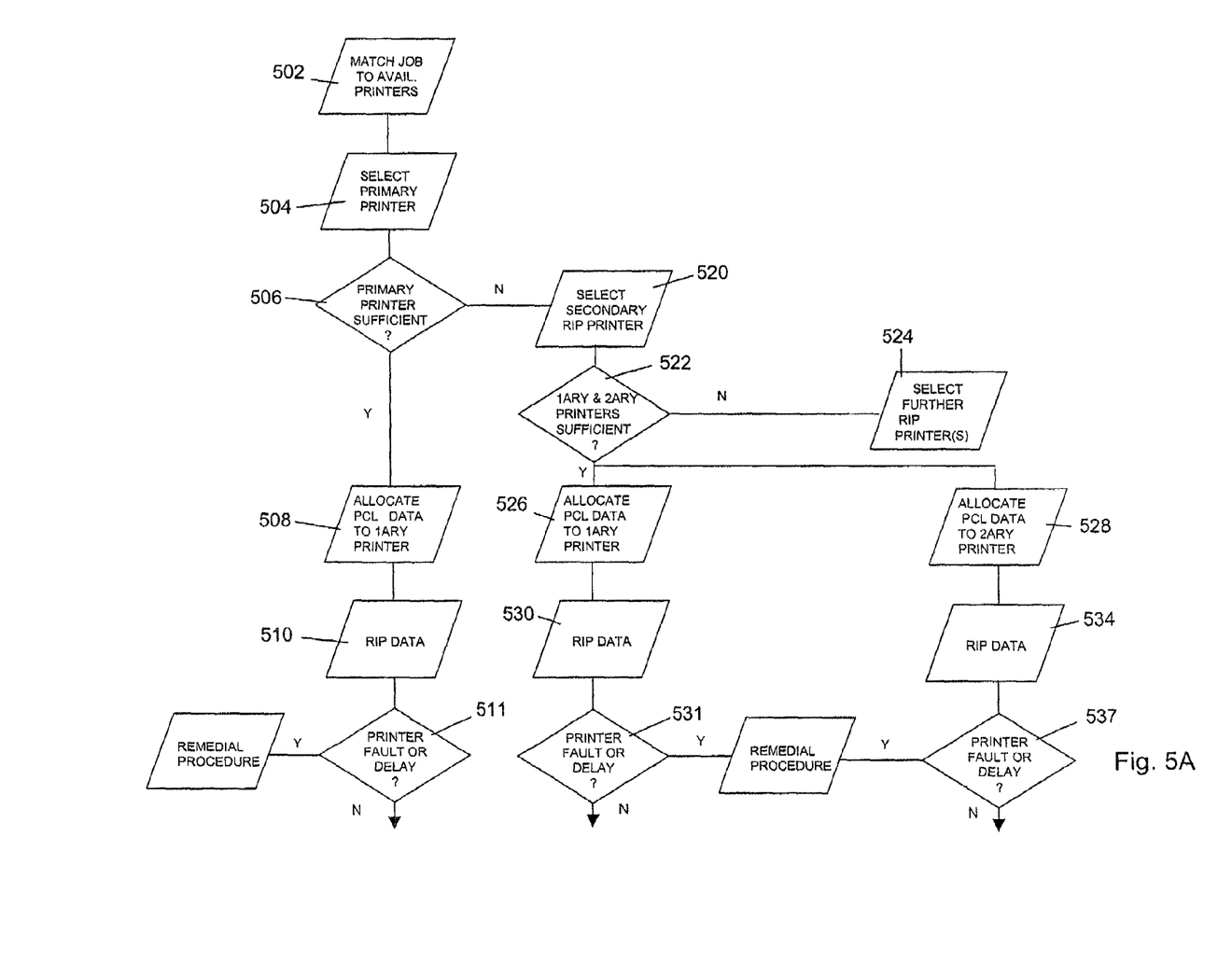
FIGS. 5A and B show a flow chart illustrating the operation of the network elements of FIGS. 2.

Referring now to FIGS. 5A and B, in the network system of FIGS. 2A and B, at step 502, upon receipt of a print job, the print manager will initially assess the size of the print job, and at step 504 determines the most appropriate, or "primary" of the printers 42A-C for the job; for the sake of clarity in this example the primary printer will be designated 42A. At step 506 the computer 40 determines whether or not the primary printer 42A is sufficient for processing (i.e. in this instance ripping and printing) the job within predetermined period of time (this time limit typically being preset within the print manager in relation to job size). This step 506 actually incorporates two steps. The first of these is an assessment by the print manager of the intrinsic capacity of the primary printer (i.e. the innate capacity of the primary printer, and not considering demands on primary printer capacity due to other jobs). The second step then takes into consideration the actual capacity, which is determined by subtracting from the intrinsic capacity any factors which may reduce this, such as: (a) printing capacity engaged by other print jobs (knowledge of which is held by the print manager, since in this example it controls all printing operations); (b) delays inherent due to network performance and policy which may affect the speed of data; and (c) any other factor having an effect of reducing intrinsic performance which the print manager is adapted to take into account. In the event that the primary printer is estimated by the print manager to be sufficient to perform the job in the predetermined time period (given that it is not possible to determine with high precision in advance either the time required to rip a PCL file, or the disk space required to do so), the computer sends, at step 508 the unripped data to the primary printer, which is then ripped at step 510 and printing takes place at step 512. Other than in the event of a fault diagnosed at steps 511 or 514, such as the ripping process being interrupted by, e.g. an error, a shortage of disk space for storing the compressed ripped data, or the print ops. failing, the job then progresses as in a known manner.

Figure 5B:
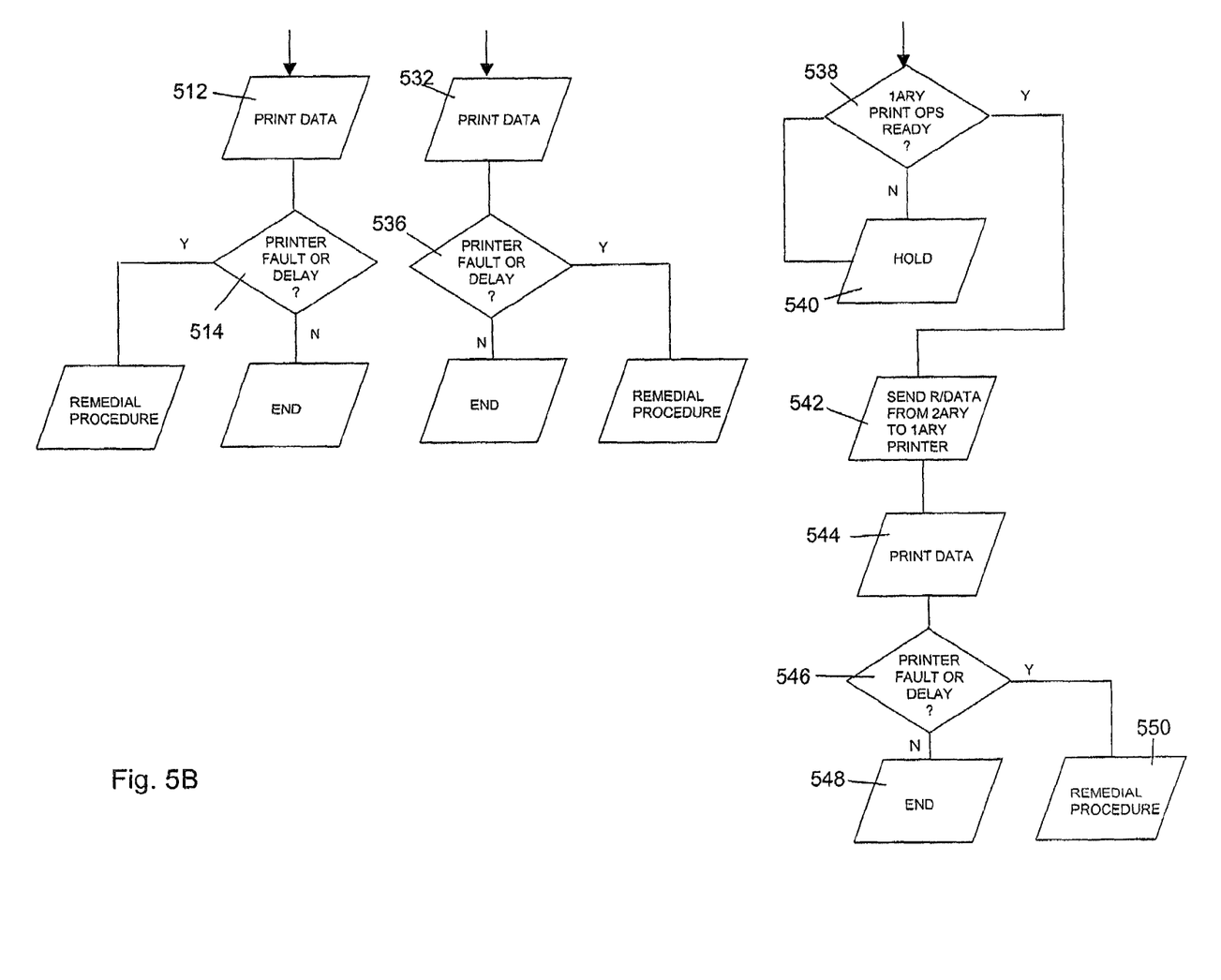

In the event that the print manager makes an estimated determination that there is insufficient capacity in the primary printer 42A, at step 520 a secondary ripping printer is selected. This process involves the print manager performing the same process steps elucidated above in relation to the description of step 506, i.e. determining the intrinsic ripping capacity of each printer, and then the real capacity once demand from other sources has been taking into consideration. The printer thus determined as having the largest ripping capacity is then selected as a secondary ripping printer, in this example printer 42B, whose job is to rip the part of the PCL file from the print manager which cannot be ripped in sufficient time by the primary printer 42A. It may be the case, depending upon the speed requirements set within the print manager, that the combined capacity of the primary and secondary printers is insufficient, and this is determined at step 522. In the event that the capacity is insufficient one or more further ripping printers are selected at step 524 in the manner described above for step 520, with the implementation following such selection being, mutatis mutandis, as described below for the primary and secondary printers. In connection with assessment of capacity, it is emphasised that a printer need not be idle to have spare ripping capacity.

Once the secondary ripping printer has been selected, the unripped data is split into two data sets, here in the form of two individual PCL files allocated to the primary printer, and secondary ripping printer at steps 526, 528 respectively. It should be noted at this point that, in this example, the two individual PCL files started out as a single PCL file, itself produced from a single data file created by a word processing program. Following a determination by the print manager that the original PCL file shall be ripped in two parts, with different parts being allocated to different printers, the data sets provided by parts of the original PCL file can if desired legitimately be treated as individual files for the purposes of transmission across the network and processing within the primary and secondary printers. These semantics do not alter the fact that, whether the data sets are regarded as two parts of single PCL file, or two individual files, the data sets are (as will be described) subsequently combined at a single printer for embodiment into a document. Further, as explained above, either the word processing file or the PCL file(s) may be termed a single source data file in dependence upon the perspective from within the print pipeline, and in any case constitute a single print job.

In the case of step 526 the PCL file is allocated to the primary printer 42A in the normal manner using simply a "print" command, and at step 530 the primary printer operates upon the PCL file in the usual manner, first ripping the PCL data, then following fault diagnosis at step 531, activating the print ops. (i.e. the feed, print engine, and finishing elements) once sufficient data has been ripped to start printing at step 532. In the case of step 528, the PCL file sent to the secondary ripping printer 42B is sent in conjunction with the RIP NPRINT command discussed above. Therefore, at step 534, the secondary ripping printer 42B rips the data (which, although not shown in FIGS. 5, is then compressed and stored on its disk), but does not pass the ripped data to the print mechanism of printer 42B. A further fault diagnosis routine follows step 534, at step 537. NB For the sake of brevity, no further reference shall be made to the compression of ripped data files. This is not however intended to cause the term "ripping" to be interpreted as implicitly including the process of compressing ripped data.

Once printing of the data ripped on the primary printer 42A has started at step 532, and subsequent to the execution of a routine at step 536 which checks for the presence of a printer fault or delay (and which will be addressed more fully subsequently), the print manager continually interrogates the primary printer status at step 538 in order to determine whether the print ops. is yet ready to receive and print further ripped data, which in the present example is the data ripped at step 534, and stored on the disk of the secondary ripping printer 42B. If the primary printer is not ready the process effectively goes into a holding phase, at step 540, which is followed by a repeat of interrogation step 538 until an affirmative answer is received. Once the primary printer is ready to receive the ripped data from the secondary ripping printer 42B, the secondary ripping printer is then instructed by the print manager, at step 542 and using the SEND function described above, to dispatch the ripped data stored on its disk to the primary printer 42A, whereupon the ripped data is printed by the primary printer at step 544. Thereafter, and following the execution of another printer fault or delay routine at step 546 the process ends, subject to the need to execute remedial procedure. With regard to the status enquiry of the print ops., it should be noted that the print ops. may return a status indicating that it is contemporaneously busy, but which nonetheless is such as to cause the print manager to SEND the secondary ripped data to the primary printer because the print manager has determined that this is the most efficient manner in which to proceed. Thus while the secondary ripped data may typically be sent to the print ops. at step 542 in response to the status enquiry returning a status indicating that the print ops. is ready to receive and process the secondary ripped data, this is not necessarily the case at that instant in time.

Figure 6:
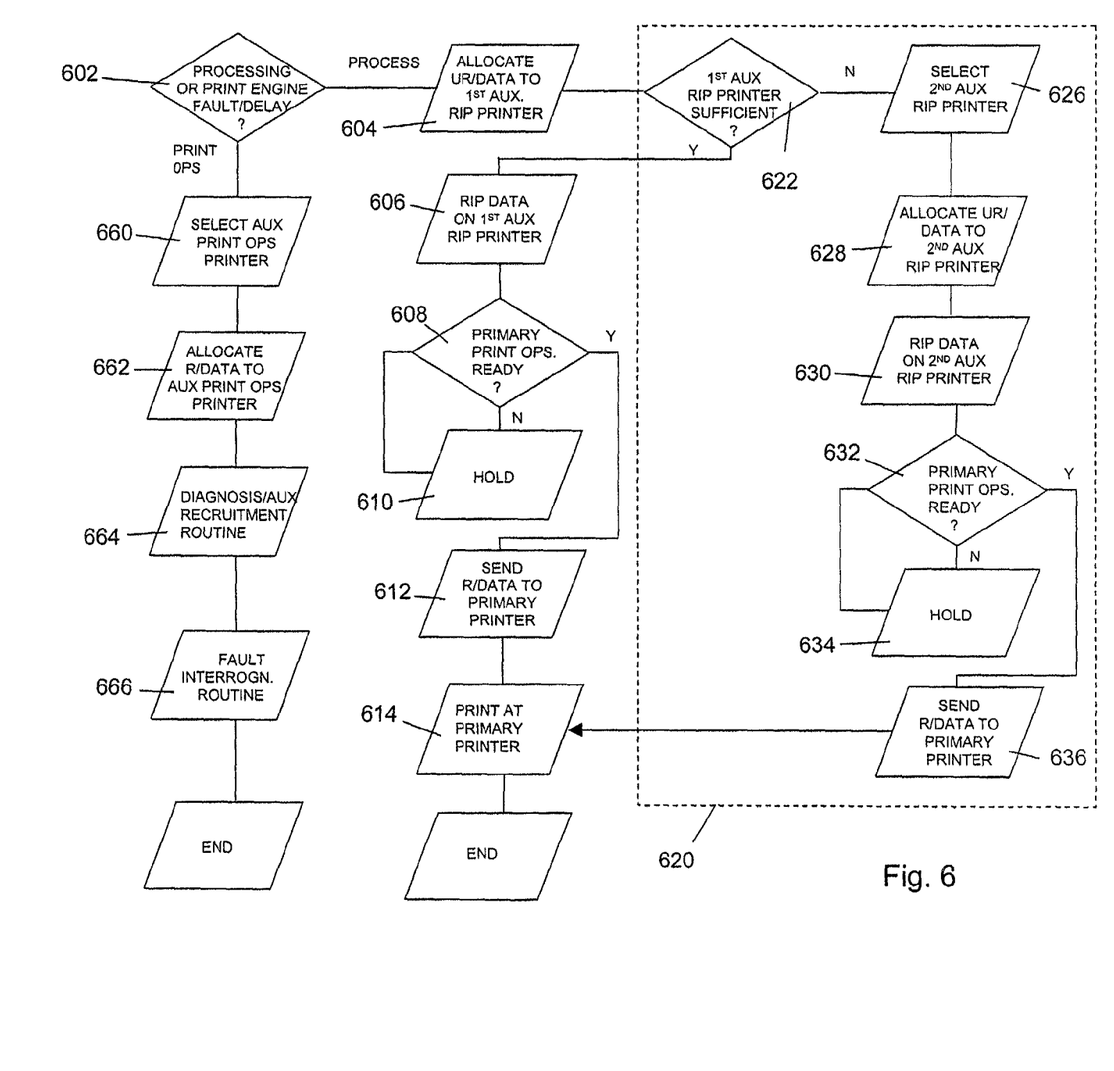
FIG. 6 shows a further flow chart illustrating the operation of a remedial procedure referenced in FIGS. 5.
Figure 7:
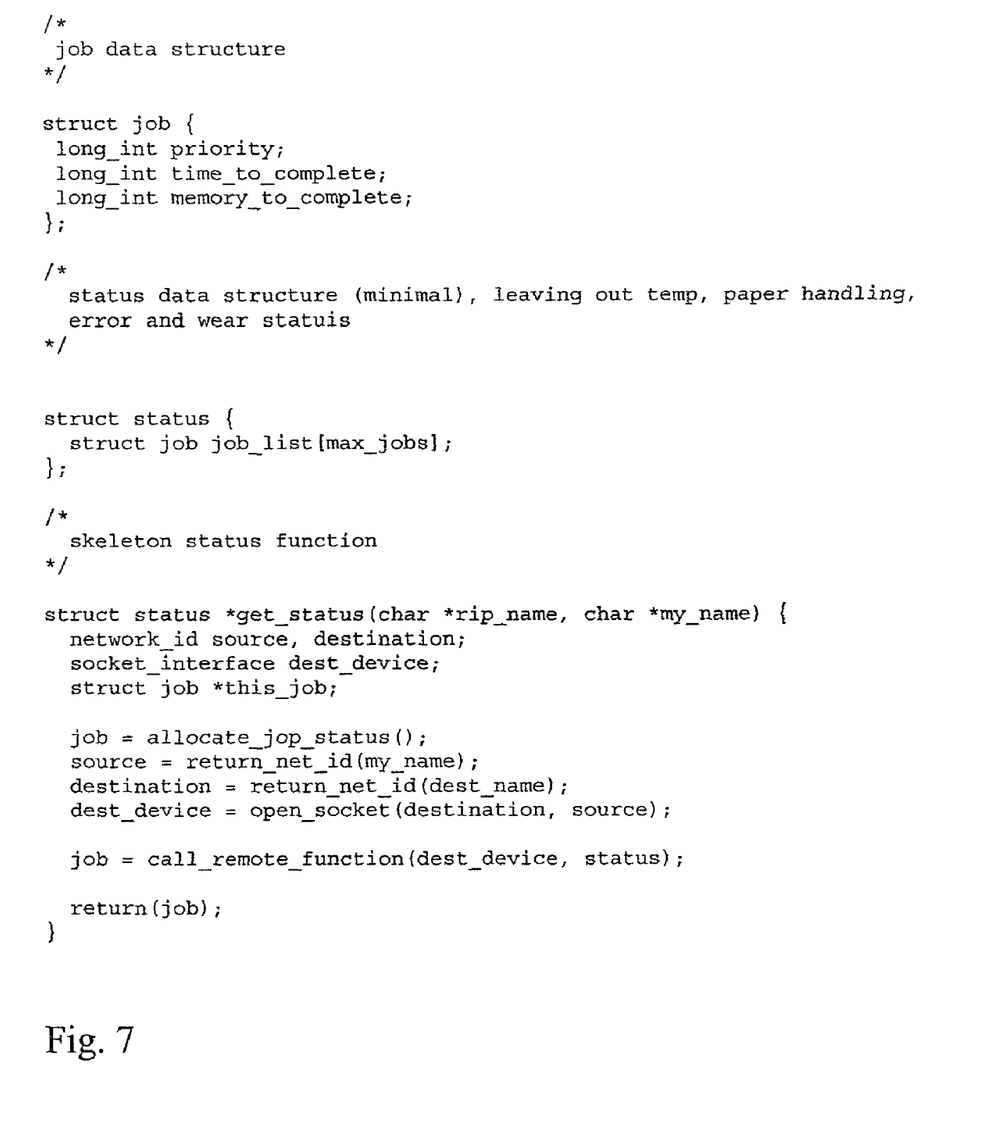
FIG. 7 is a program listing for a further additional function, which according to a modification, is executable with network printers of FIGS. 2A and B.

A collateral benefit of providing the additional SEND and RIP NPRINT functions in the printers 42 is that a greater degree of flexibility is provided with regard to the recovery of jobs that have not been executed because of problems. The printer fault or delay routines referred to above, at steps 511, 514, 531, 536, 537 and 546 are all followed by the execution of a remedial procedure 600 in the event that a printer fault or delay is detected, and this procedure will now be explained with reference to FIG. 6. At step 602 the print manager determines from the error or status message of the printer in respect of which the fault or delay has occurred whether the problem is as a result of a processing delay (e.g. something to do with the ripping procedure, such as for example the printer running out of disk space to store the ripped data) or is related to the performance of the print ops. If the printer is not inherently capable of providing this status information, it may be adapted to do so by the provision of auxiliary system software in the form of a further additional library function known as GET STATUS, a program listing for which is shown in FIG. 7. The status information may be then obtained by the print manager in response to a GET STATUS command. In the event that the fault relates to processing of the PCL data file, at step 604 the print manager instructs the printer in respect of which the fault has occurred, using a SEND command, to dispatch unripped data to an auxiliary ripping printer (hereinafter "first auxiliary ripping printer"), which will typically be the printer having the largest real capacity also involved in processing the job. Following execution of a diagnosis and recruitment routine 620, which is described below, the print manager then issues the first auxiliary ripping printer with the RIP NPRINT command at step 606, and the unripped part of the PCL file is then ripped on the first auxiliary ripping printer. At step 612, following the execution of the interrogation routine involving steps 608 and 610 (described above in connection with steps 538 and 540), and using the SEND command once more, the print manager instructs the first auxiliary ripping printer to send the ripped data to the primary printer where the processing fault occurred, after which (and possibly subject to execution of a further routine to investigate the presence of faults, which is not shown in the flow chart), the document is printed on the primary printer at step 614 and the process ends.

It may be the case that the first auxiliary ripping printer is not capable on its own of ripping the remaining unripped data, and that further auxiliary ripping printers may be required in order to process the job smoothly and at optimum rate. This is determined and dealt with by a diagnosis and recruitment routine 620 which includes the following steps. At step 622 the print manager determines whether the first auxiliary ripping printer designated is sufficient to perform the ripping operation in the allotted time (this being the predetermined time set in the print manager in relation to the size of the job). If it is determined that the first auxiliary ripping printer is sufficient then the first auxiliary printer is instructed, as described for step 606 above, to rip the data. If it is determined that further ripping capacity is required in order to perform at the required speed, a second auxiliary ripping printer is recruited at step 626; the selection process for this printer being as previously described in relation to step 520 above. The excess part of the PCL file, i.e. the part of the PCL file which the first auxiliary ripping printer cannot process in time is then sent to the second auxiliary ripping printer using the RIP NPRINT command at step 628, and is ripped at step 630. At step 636, following the interrogation routine of steps 632 and 634 in which the print manager determines that print ops of the primary printer are ready to receive further ripped data, the print manager issues the SEND command to the second auxiliary printer, and the ripped data stored on the second auxiliary printer is sent to the primary printer, where, at step 614 the data is printed and the process then ends. Further fault interrogation routines (as described e.g. at step 511) may be included as appropriate.

In the event that the primary printer fault relates to the performance of the print ops. the print manager of computer 40 selects, at step 660, an auxiliary print op. printer in a manner analogous to that described above in relation to steps 520 and 626, following which the ripped data is sent to the auxiliary print op. printer at step 662. A diagnosis and recruitment routine 664 (analogous to the routine 620, described in detail in steps 622 to 638) and a fault interrogation routine 666 (analogous to that described at, e.g. step 514) follow, and subject to the satisfactory completion of these routines, the process ends.

As mentioned previously, printers include a relatively large amount of processing and storage capability which might more ordinarily be associated with computers, and in contemporary commercial terms the distinction between printer and computer turns primarily upon which of the two includes the print operations functionality. It may be the case that a printer in a network possesses storage and processing capability which is remotely located in geographical (both in the IT network and the more ordinary sense) terms, but which is specifically allocated to that printer for the purpose of ripping, compressing and storing data. Indeed it is sometimes the case that the ripping for a particular printer takes place inside the computer which is being used to dispatch source data to the printer in question for printing. It is thus on occasions difficult to establish whether a particular block of computing functionality is, in functional terms, part of a particular printer. One relatively straightforward (though not exhaustive) test is to view the issue from the perspective of the print manager which is controlling the network printing operation. Thus, for example, if a particular element or elements of computing capability appear to the print manager to be operating on behalf of the print operations function of a particular printer, then they should be considered for the purposes of the present invention to comprise part of that printer, even though, for example, they may well be physically located in the same computer which is operating the print manager. Accordingly, in a modification of the illustrated embodiments, a dedicated ripping entity may be provided to serve one or more network printers.

As mentioned previously, in the above example it is assumed that the print manager is solely capable of instructing any printer in the network, and so is inherently capable of determining the actual capacity of each printer under its control. In more complex networks however, many computers will typically have the ability to control many printers, and so determination and monitoring of printer capacity and activity is more difficult. In a further embodiment in which network elements other than the print manager of the present invention are able to instruct printers, the print manager may optionally also be located in one of the printers 42; in a spooler 60, in a bridge (not shown) between two branches of a network, or in any other suitable place.

A consequence of the print manager no longer having absolute control over all printing operations is that in order to determine the capacity of a given printer, the print manager must interrogate the printer in question for information which printers are not typically adapted to provide automatically. This may be done using the GET STATUS function referred to above. In response to a GET STATUS command, a printer provides data on: the number of jobs currently in its queue; the priority of the jobs (according to a pre-established network protocol); the aggregate job size; the expected execution time; inherent status information relating to, for example, toner levels, paper and power supply temperature; and any other relevant data. Following a response to a GET STATUS command, the print manager then proceeds as set out above in FIGS. 5 and 6.

The present invention has been illustrated with reference to the recruitment of a single additional printer for the purpose of ripping a print job, subject to incidence of faults or problems. The invention encompasses the employment of further printers for this purpose as necessary, in accordance with capacity and speed considerations, this being achieved in the manner set out above for a second printer, and so no limitation on the number of printers thus employed is intended.

Reference has been made, in order to exemplify the methods and apparatus' of the present invention to the creation of source data files using word processing programs. It is to be emphasised that source data files for printing may come from many sources and have many forms, including without limitation, automatic utility bill generating software, for example.

The invention claimed is:

1. A method of printing a document comprising:
   sending a first set of source data to a primary printer for raster scanning by the primary printer to produce a first raster data file;
   sending the first raster data file to a print engine of the primary printer;
   operating the print engine on the basis of the first raster data file to create a first part of the document;
   sending a second set of source data to a secondary printer for raster scanning by the secondary printer to produce a second raster data file;
   sending the second raster data file from the secondary printer to the print engine of the primary printer; and
   operating the print engine on the basis of the second raster data file to produce a second part of the document.

2. The method according to claim 1 further comprising storing the second raster data file on a storage medium of the second printer.

3. The method according to claim 1 further comprising compressing the first and second raster data files, and storing compressed first and second raster data files on storage media of the first and second printers.

4. The method according to claim 1, further comprising establishing the existence of a predetermined status condition of the print engine prior to sending the second raster data file to the print engine of the primary printer.

5. The method according to claim 4 wherein the predetermined status condition of the print engine is a status in which the print engine is ready to operate on the second raster data file.

6. The method according to claim 1 wherein the method is controlled by a print management program running on a computer.

7. The method according to claim 1 wherein the method is controlled by a print management program running on a printer.

8. The method according to claim 1 further comprising:
   sending further sets of the source data to further printers for raster scanning by the further printers to produce further raster data files;
   sending the further raster data files from the further printers to the print engine; and
   operating the print engine of the primary printer on the basis of the further raster data files to produce further parts of the document.

9. The method according to claim 1 wherein the printers operate to create a document by depositing ink on an ink-carrying medium.

10. The method according to claim 1, further comprising selecting a secondary printer including: obtaining from at least one potential secondary printer status information relating to at least one of: number of jobs currently in a candidate second printer's queue; priority of jobs in the candidate second printer's queue; aggregate size of the candidate second printer's jobs; and the expected execution time for the candidate second printer's jobs prior to sending said second part of the source data file to said secondary printer.

11. The method according to claim 1 wherein the first and second sets of source data originate from a single source data file.

12. The method according to claim 11 wherein the source data is a file created by a word processing program.

13. A print managing computing entity adapted to:

send a first set of source data to a primary printer for raster scanning by the primary printer to produce a first raster data file;

sending the first raster data file to a print engine of the primary printer;

operating the said print engine on the basis of the first raster data file to create a first part of a document;

sending a second set of source data to a secondary printer for raster scanning by the secondary printer to produce a second raster data file;

sending the second raster data file from the secondary printer to the said print engine; and operating the said print engine of the primary printer on the basis of the second raster data file to produce a second part of the said document.

\* \* \* \* \*